(12) United States Patent
Lin et al.

(10) Patent No.: US 8,033,002 B2
(45) Date of Patent: Oct. 11, 2011

(54) METHOD FOR CONFIGURING AN END-OF-ARM TOOL FOR A ROBOTIC ARM

(75) Inventors: Yhu-Tin Lin, Rochester Hills, MI (US); James W. Wells, Rochester Hills, MI (US); Bradley J. Walworth, Rochester, MI (US); Lance T. Ransom, Essex (CA); Roland J. Menassa, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 918 days.

(21) Appl. No.: 12/026,905

(22) Filed: Feb. 6, 2008

(65) Prior Publication Data

US 2009/0193642 A1  Aug. 6, 2009

(51) Int. Cl.
*B21D 39/00* (2006.01)

(52) U.S. Cl. ............ 29/434; 29/464; 29/559; 29/281.4; 269/55; 901/30; 901/41

(58) Field of Classification Search .................. 29/434, 29/464, 465, 466, 467, 559, 281.4; 901/30, 901/41; 269/55, 56, 61, 71
See application file for complete search history.

(56) References Cited

U.S. PATENT DOCUMENTS 6,416,706 B1  7/2002  Fisher et al.
6,644,637 B1  11/2003  Shen et al.

*Primary Examiner* — Jermie Cozart

(57) ABSTRACT

An end-of-arm tool having a workpiece interface tool is attachable to an articulable robotic arm. The end-of-arm tool can be configured by engaging an adjustable modular unit including a swing arm, a cylinder, and a workpiece interface tool to a rail element of the end-of-arm tool. The adjustable modular unit machine-slides in the rail element to a preferred x-axis position, machine-pivots to a preferred angular orientation, and machine-extends along a longitudinal axis of the cylinder to a preferred z-axis position, and machine-rotates to a preferred rotational angle about the z-axis.

20 Claims, 4 Drawing Sheets

METHOD FOR CONFIGURING AN END-OF-ARM TOOL FOR A ROBOTIC ARM

TECHNICAL FIELD

This disclosure is related to tooling for use at an end of a robotic arm.

BACKGROUND

Known end-of-arm devices attached to robotic apparatuses are used to manipulate a workpiece. An end-of-arm device can be used to grasp a workpiece, transport the workpiece to a new location, and orient and release the workpiece. The end-of-arm device is preferably adjustable to permit utilization with workpieces of multiple designs. It is known to adjust an end-of-arm device for utilization with workpieces of multiple designs by manually adjusting specific elements of the end-of-arm device. Manually adjusting specific elements of the end-of-arm device is known to consume time and is prone to errors. Applications of robotic apparatuses with end-of-arm devices can encompass material handling, manufacturing, packaging, and testing.

SUMMARY

A method for configuring an end-of-arm tool attachable to an articulable robotic arm includes slidably engaging an adjustable modular unit including a swing arm, an extendable cylinder, and a workpiece interface tool to a rail element of the end-of-arm tool. An x-axis relative to the rail element, an x-y plane relative to the swing arm, and a z-axis orthogonal to the x-y plane are defined. The adjustable modular unit is machine-slid in the rail element to a preferred x-axis position. The swing arm is machine-pivoted to a preferred angular orientation determined based upon a preferred y-axis position and the preferred x-axis position. The extendable cylinder is machine-extended along a longitudinal axis to a preferred z-axis position. The workpiece interface tool is machine-rotated to a preferred rotational angle about the z-axis.

BRIEF DESCRIPTION OF THE DRAWINGS

One or more embodiments will now be described, by way of example, with reference to the accompanying drawings, in which.

DETAILED DESCRIPTION

Figure 1:
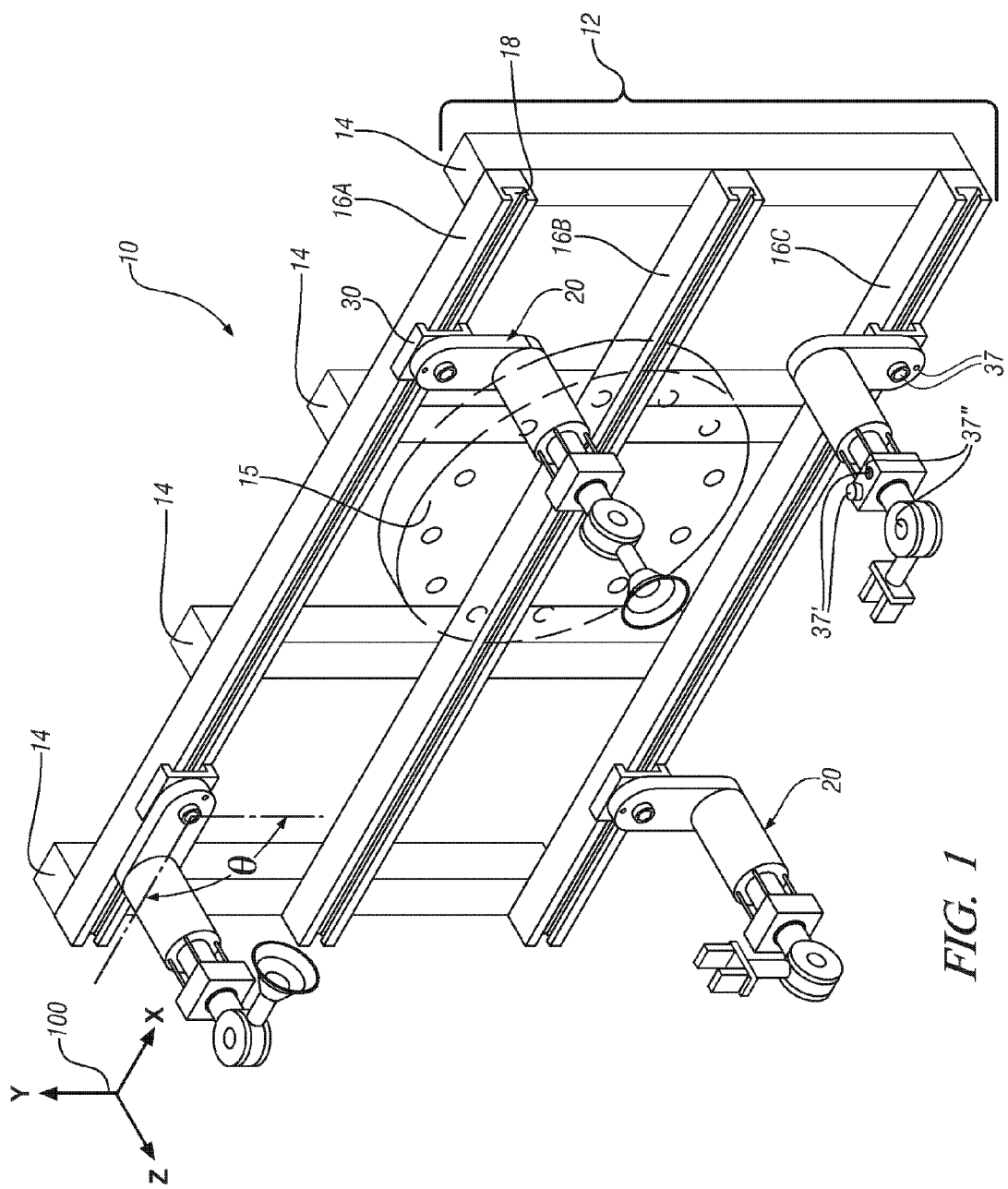
FIG. 1 is a three-dimensional schematic diagram, in accordance with the present disclosure.

Referring now to the drawings, wherein the showings are for the purpose of illustrating certain exemplary embodiments only and not for the purpose of limiting the same, FIGS. 1, 2, 3, and 4 schematically illustrate an end-of-arm-tool 10 (hereafter 'EOAT') that can be machine-configured to a preferred configuration. The EOAT 10 preferably attaches to a free end of an articulable robotic arm 5, or other material handling device (not shown). The robotic arm 5 comprises a programmable device fixed to a base and operative to linearly and rotationally translate the EOAT 10 in space. A spatial coordinate system comprising an x-y-z coordinate system 100 including an x-axis, a y-axis and a z-axis, is described in further detail hereinbelow to facilitate understanding of the disclosure.

Design of the EOAT 10 is based upon quantifiable features of one or more workpieces (not shown) on which the EAOT 10 works, including, e.g., spatial geometry, mass, and special handling requirements of the workpiece. The EOAT 10 comprises a base frame 12 comprising one or more rail element(s) 16, one or more machine-adjustable swing arm(s) 22 slidably attached to one of the rail elements 16, a machine-adjustable extendable shaft 40 attached to one end of each of the swing arm(s) 22, and a workpiece interface tool 80 attached to each of the extendable shaft(s) 40. Each combination of the swing arm 22, the extendable shaft 40 and the workpiece interface tool 80 preferably constitutes a modular assembly 20. The workpiece interface tool 80 comes into contact with a workpiece (not shown) during operation of the robotic arm 5 with the EOAT 10. The extendable shaft 40 described herein comprises an extendable cylinder 40. The workpiece interface tool 80 is configured to the preferred position comprising a predetermined x-axis position, a predetermined y-axis position, a predetermined z-axis position, a predetermined rotational angle $\phi$ about the z-axis of the x-y-z coordinate system 100, and a predetermined swivel angle $\alpha$.

The base frame 12 comprises a plurality of rigid elements 14, oriented vertically as depicted, with the rail elements 16 fixedly attached. Three rail elements are depicted, identified as 16A, 16B, and 16C. The rail elements 16 are oriented in and define the x-axis of the x-y-z coordinate system 100. The rail elements 16A, 16B, and 16C and the rigid elements 14 define an x-y plane of the x-y-z coordinate system, with the rigid elements 14 oriented parallel to the y-axis as depicted. A connector device 15 fixedly attaches to one or more of the rigid elements 14 and is fixedly connectable to the robotic arm 5. The connector device 15 preferably comprises a quick connect/disconnect device (not shown in detail), and includes a mechanical connection between the EOAT 10 and the robotic arm 5. The connector device 15 can be adapted to provide pneumatic, electrical, and hydraulic connections between the robotic arm 5 and the EOAT 10 to permit remote control of the workpiece interface tool(s) 80 (not shown in detail). The rail element(s) 16 each comprises a rigid device having a T-slot 18 machine-cut therein along the length of the rail element 16, i.e., parallel to the x-axis, with a base of the T-slot 18 oriented to open in the z-axis in this embodiment.

Each modular assembly 20 comprises the adjustable swing arm 22, the extendable cylinder 40, and a rotator set 60, and attaches to the workpiece interface tool 80. The machine-adjustable swing arm 22 comprises a flat, rigid device, preferably constructed of bar stock and having a fixed length, and having a first end 23 and a second end 24, and a first side 25 and a second side 26. The first end 23 of the swing arm 22 includes a circular bolt hole 28 which passes therethrough, and a cylindrically shaped dowel hole 27 on the second side 26 of the swing arm 22. An annular race 29 is cut to a predetermined depth into the first side 25 concentric to a center line of the circular bolt hole 28. The annular race 29 tapers concentrically inwardly from the first side 25, shown as 29A, and also includes a second surface 29B. The first side 25 of the first end 23 of the swing arm 22 physically adjoins and interacts with a carrier assembly 30 at the annular race 29. A machine-engageable bolt 34 passes through the circular bolt hole 28 and threads with a T-nut 35 thus joining the swing arm 22 and the carrier assembly 30. The machine-engageable bolt 34 and the dowel hole 27 form a machine interface 37 which can interact with an end-effector device 137. The machine-engageable bolt 34 and the dowel hole 27 are aligned, including a predetermined distance between center lines of the machine-engageable bolt 34 and the dowel hole 27 and a predetermined height between a base of the machine-engageable bolt 34 and a bottom of the dowel hole 27.

The swing arm 22 and the carrier assembly 30 slidably attach to one of the rail elements 16 via the carrier assembly 30. The swing arm 22 is pivotable around the machine-engageable bolt 34 in the x-y plane. The carrier assembly 30 comprises a carrier element 32 formed to fit around a portion of the outside of the rail element 16 and move slidably along the length thereof. The carrier assembly 30 includes a pass-through hole 38 through which passes the T-nut 35, and an annular ridge 39 concentric to the pass-through hole 38. An outer surface of the annular ridge 39 includes a tapered portion 39A and a second surface 39B. The carrier element 32 and the swing arm 22 are assembled such that the machine-engageable bolt 34 and the T-nut 35 are concentric to and pass through the pass-through hole 38 and the circular bolt hole 28, and the annular ridge 39 inserts in and engages the annular race 29. The tapered portion 29A of the annular race 29 and the tapered portion 39A of the annular ridge 39 forms a conic interface preferably having a shallow taper, preferably less than 10°. The second surface 29B of the annular race 29 forms an interface with the second surface 39B of the annular ridge 39. Thus, the annular race 29 and the annular ridge 39 can effect locking therebetween when compressively clamped together. The machine-engageable bolt 34 secures the carrier element 32 to the rail element 16, and the head of the T-nut 35 is adapted to fit within the T-slot 18 of the rail element 16. A compression spring 36 is added between the T-nut 35 and the carrier element 32 to maintain physical contact between the swing arm 22 and the carrier assembly 30 when the modular assembly 20 is separated from the rail element 16. The modular assembly 20 can be fixedly locked to the rail element 16 by tightening the machine-engageable bolt 34 to the T-nut 35, compressively clamping the tapered portion 39A of the annular ridge 39 against the tapered portion 29A of the annular race 29. The second surface 39B of the annular ridge 39 is located against second surface 29B of the annular race 29 to aid in precisely locating the swing arm 22 to the center of the carrier assembly 30 when loosened. As described with reference to FIG. 2, the end-effector device 137 engages the machine-engageable bolt 34 to apply a rotational torque thereto, thus spinning the machine-engageable bolt 34 to effect tightening and loosening thereof. The extendable cylinder 40 is fixedly attached to the adjustable swing arm 22 on the second side 26 of the second end 24 such that a longitudinal axis 41 of the extendable cylinder 40 projects in the z-axis and is preferably parallel thereto.

Figure 2:
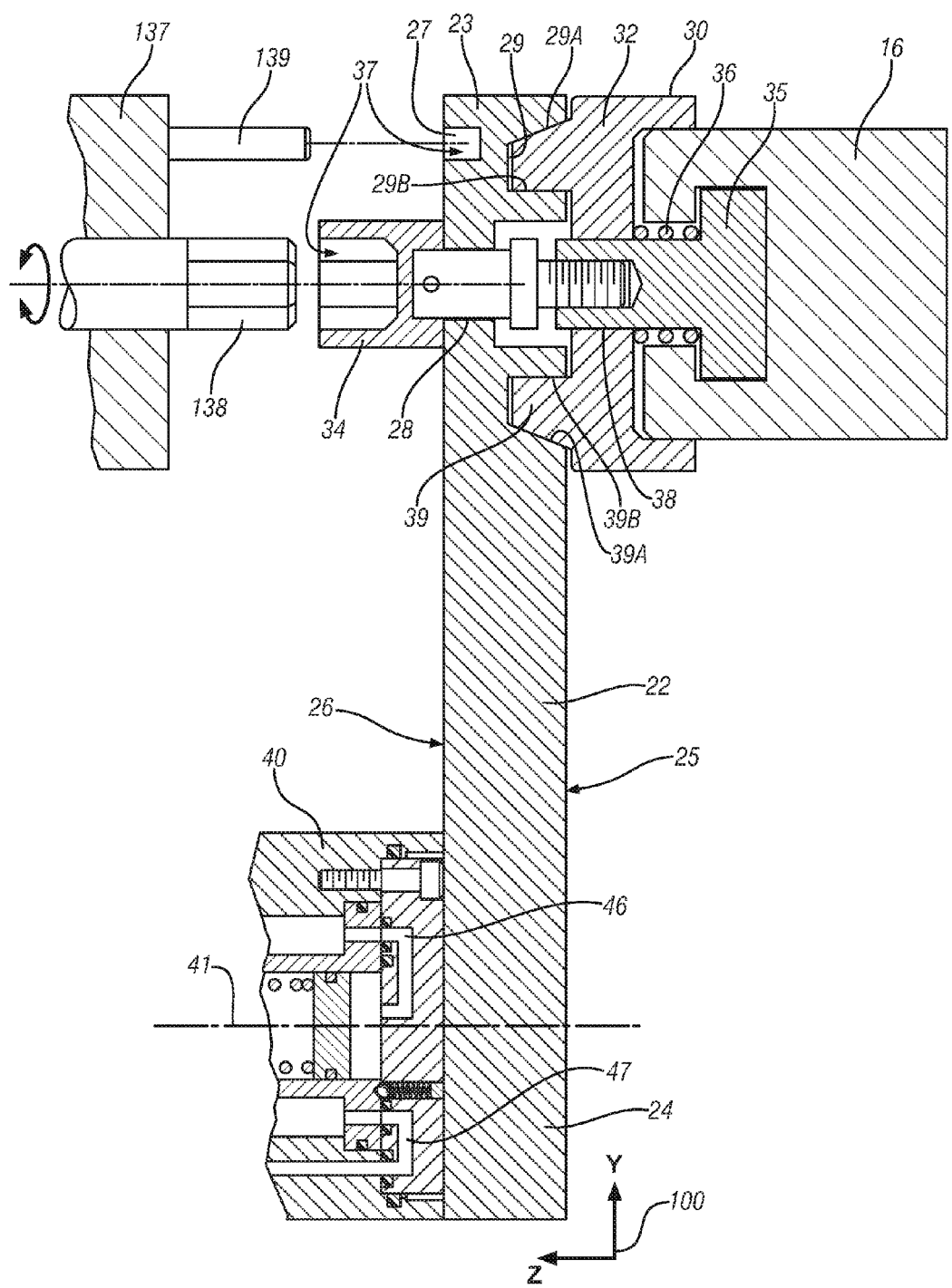
FIGS. 2, 3, and 4 are two-dimensional schematic diagrams, in accordance with the present disclosure.
Figure 3:
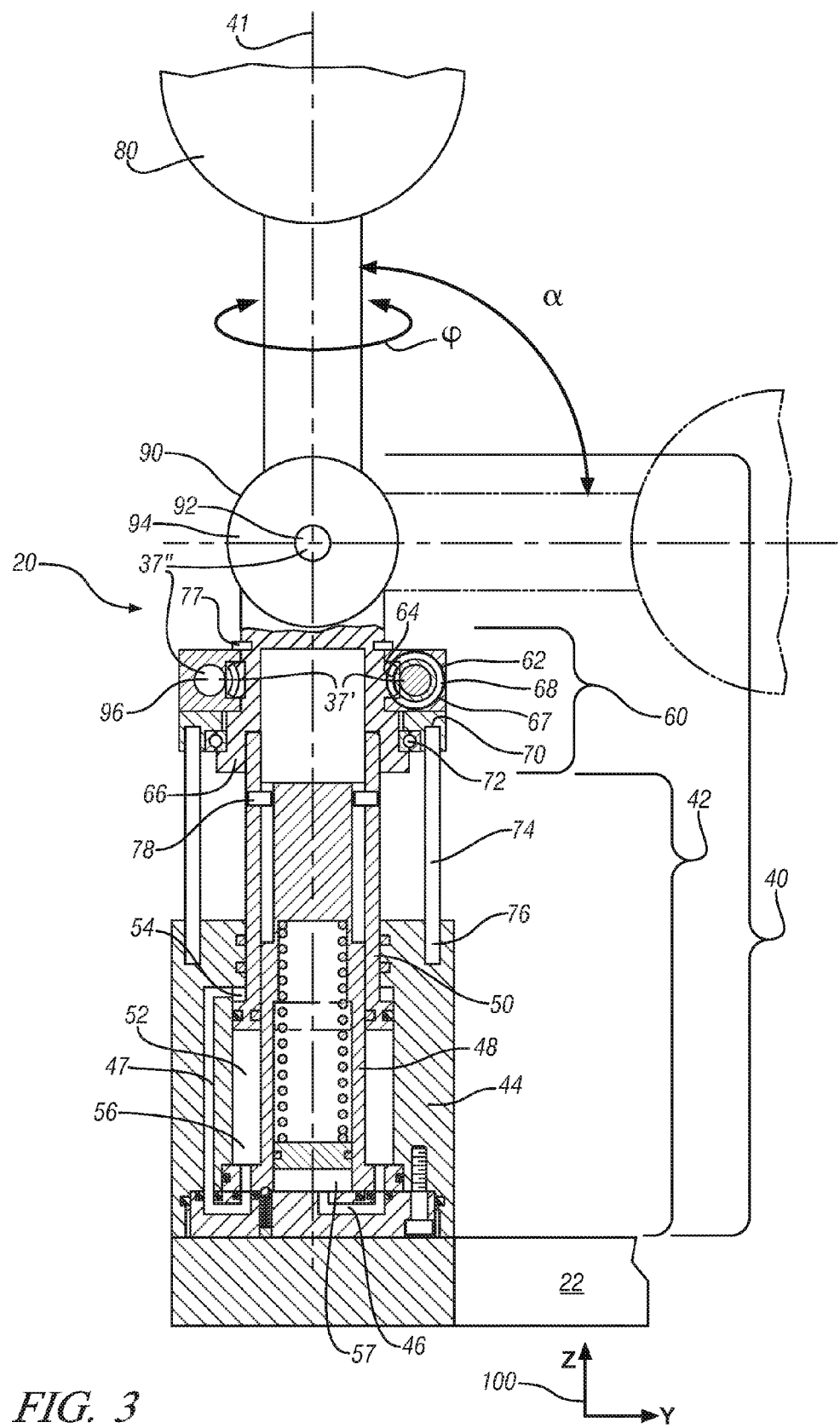
Figure 4:
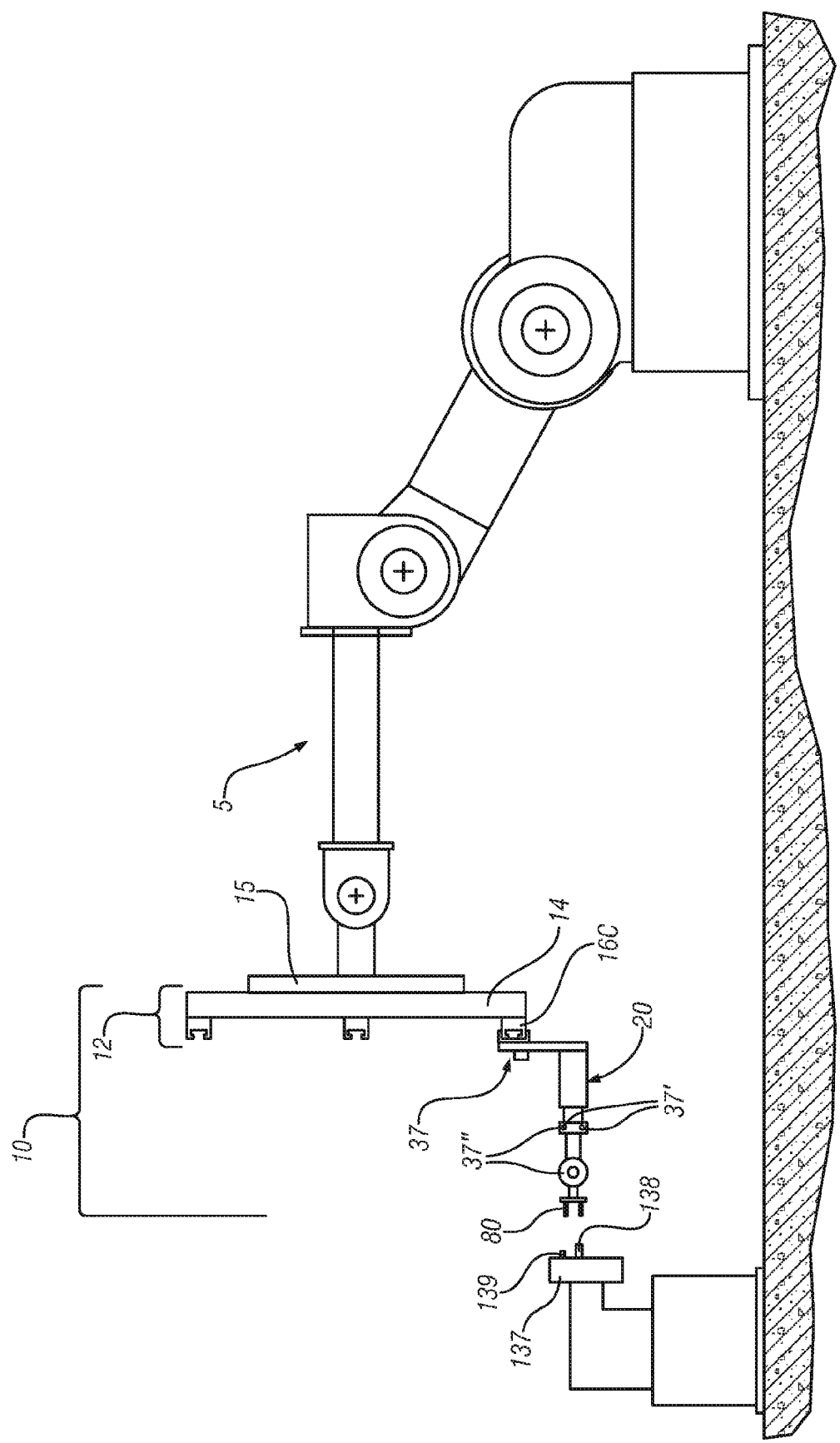

FIG. 3 depicts an embodiment of the extendable cylinder 40. The extendable cylinder 40 includes a self-contained hydraulic cylinder device 42 extendable along the longitudinal axis 41 when unlocked, and the rotator set 60 rotatable around the longitudinal axis 41. The self-contained hydraulic cylinder device 42 includes a cylindrically-shaped outer casing 44 fixedly attached to the swing arm 22 and projecting therefrom, preferably along the z-axis. The outer casing 44 includes a piston chamber 52 consisting of an upper piston chamber 54, and lower piston chambers 56, 57, which are defined by the piston chamber 52 and a piston 50 and a center post 48 inserted therein. The piston 50 and the center post 48 are rotatable about the longitudinal axis 41 within the piston chamber 52 to a first position (as shown in FIG. 2) and a plurality of second positions (not shown). The first position serves to unlock the extendable cylinder 40 and is defined by a rotational position of the center post 48 wherein the fluidic channels 46, 47 are opened and permit flow of hydraulic fluid between the upper piston chamber 54 and the lower piston chambers 56, 57 when either a compressive force or a tensile force is applied to the piston 50, e.g., by the end-effector device 137. Thus, when the center post 48 is in the first position, the z-axis position can be changed by extending the piston 50 along the longitudinal axis 41. The second positions (not shown) lock the extendable cylinder 40 at the longitudinal position, and are defined by the fluidic channels 46, 47 being closed, stopping flow of hydraulic fluid between the upper piston chamber 54 and the lower piston chambers 56, 57 and fixing the z-axis position of the workpiece interface tool 80 attached to the piston 50. Alternatively, other devices (not shown) can be used to lockably extend along the z-axis and thus effect change of the z-axis position of the workpiece interface tool 80.

The rotator set 60 attaches to an end of the piston 50 distal to the swing arm 22. The rotator set 60 comprises a worm gear set 62 as shown, and preferably a lockable swivel device 90. The rotator set 60 attaches to the workpiece interface tool 80, and controls the rotational angle $\phi$ about the z-axis. The worm gear set 62 includes a worm wheel 64 built on a hollow worm wheel adapter 66 fixedly attached to the end of the piston 50 distal to the swing arm 22. Thus, the worm wheel 64 rotates and moves in concert with rotation of the piston 50. A worm gear 68, similar to a lead screw, mounts on a worm gear adapter 70 and rides on the worm wheel adapter 66 through a thin radial ball bearing 72. The worm gear 68 includes a machine-engageable bolt 67 having the same effective dimensions as the machine-engageable bolt 34. The worm gear adapter 70 has at least one anti-rotation pin 74 that slides in a guiding hole 76 in the outer casing 44 of the self-contained hydraulic cylinder device 42. Driving, i.e., rotating the worm gear 68 rotates the worm wheel 64 and in turn rotates the piston 50 and the center post 48 through keyways 78 or splines, while the radial ball bearing 72 and the anti-rotation pin 74 keep the worm gear 68 and the worm gear adapter 70 stationary to the orientation of the outer casing 44 of the self-contained hydraulic cylinder device 42. The worm gear adapter 70 is trapped in between the worm wheel adapter 66 and a retaining ring 77 on its top and move together axially for adjustment, i.e., extension or retraction along the z-axis.

The lockable swivel device 90 includes a driving head 92 and swivel cap 94. The lockable swivel device 90 is preferably built on the modular assembly 20 such that the driving head 92 of the swivel device 90 and the machine-engageable bolt 67 of the worm gear 68 and a locating dowel hole 96 are all on the same plane when the extendable cylinder 40 is unlocked via rotation of the piston 50 to the first predetermined position for adjustment in the z-axis. The lockable swivel device 90 swivels to the predetermined swivel angle $\alpha$ which preferably ranges from −90 to +90 degrees relative to the longitudinal axis 41.

A second machine interface 37' to interact with the end-effector device 137 is formed by the machine-engageable bolt 67 and the locating dowel hole 96 on the rotator set 60. The machine-engageable bolt 67 and the locating dowel hole 96 have the same alignment as is used for the machine-engageable bolt 34 and the dowel hole 27. The machine-engageable bolt 67 and the locating dowel hole 96 have the same effective dimensions as the machine-engageable bolt 34 and the dowel hole 27. A third machine interface 37" operable to interact with the end-effector device 137 is formed by the driving head 92 and the locating dowel hole 96 on the rotator set 60. The driving head 92 and the locating dowel hole 96 have the same alignment and the same effective dimensions as the machine-engageable bolt 34 and the dowel hole 27. Preferably, the second machine interface 37' and the third machine interface 37" are on the same plane to facilitate interaction with the end-effector 137. Thus, the end-effector device 137 can interact interchangeably with any one of the machine interfaces 37, 37', and 37".

The workpiece interface tool 80 interacts with a workpiece. Exemplary workpiece interface tools 80 include suction cups, vacuum cups, clamps, pliers, fingers, sprue cutters, welding tools and other devices, and are not depicted in detail herein. When the workpiece interface tool 80 requires some form of power for actuation, including, e.g., electrical, hydraulic, and pneumatic power, the actuation power is preferably channeled through the connector device 15.

The end-effector device 137 comprises an external device operative to engage, interact and work with the robotic arm 5 to configure the workpiece interface tool(s) 80 of the modular assembly(ies) 20 to the predetermined positions on the EOAT 10 defined by the x-axis position, the y-axis position, the z-axis position, the rotational angle $\phi$, and the swivel angle $\alpha$.

The end-effector device 137 includes a motorized nut-runner 138 and the drive pin 139 dimensionally aligned to engage one or more of the machine interfaces 37, 37', 37" of the EOAT 10. The motorized nut-runner 138 preferably comprises a hex-head socket sized to fit the machine-engageable bolt 34, and is attached to a drive system (not shown) which is controllable to rotate in both clockwise and counter-clockwise directions. The drive pin 139 is dimensionally consistent with the dowel hole 27 and locating dowel hole 96 for insertion and rotation therein when the end-effector device 137 engages one of the interfaces 37, 37', and 37" of the EOAT 10. The end-effector device 137 includes the drive pin 139 insertable into the dowel hole 27 to pivot the swing arm 22 in the x-y plane, and insertable into the locating dowel hole 96 of the rotator set 60.

The robotic arm 5 and the end-effector device 137 are operationally coordinated to linearly and rotationally translate the EOAT 10 during a setup process. The setup process to configure each modular assembly 20 of the EOAT 10 preferably includes first positioning the modular assembly 20 on the EOAT 10 to the predetermined x-axis and y-axis positions. The workpiece interface tool 80 is then set to the predetermined swivel angle $\alpha$ about the longitudinal axis 41 of the lockable swivel device 90, on systems so equipped. The modular assembly 20 is then set to the predetermined z-axis position, and the workpiece interface tool 80 is then oriented to the predetermined rotational angle $\phi$ about the longitudinal axis 41 of the extendable cylinder 40, preferably about the z-axis.

The robotic arm 5 positions the modular assembly 20 to engage the first machine interface 37 to the end-effector device 137. The motorized nut-runner 138 engages the machine-engageable bolt 34 and the drive pin 139 engages the dowel hole 27. The motorized nut-runner 138 spins the machine-engageable bolt 34 to loosen the swing arm 22 and the carrier assembly 30 from the rail element 16. With the end-effector device 137 engaged to the EOAT 10, the robotic arm 5 is controlled to machine-slide the carrier assembly 30 to the predetermined x-axis position by sliding the carrier assembly 30 along the rail element 16. The end-effector device 137 then uses the drive pin 139 and the dowel hole 27 to machine-pivot the swing arm 22 around the machine-engageable bolt 34 to a preferred angular orientation $\theta$. The predetermined x-axis position and the preferred angular orientation $\theta$ are set such that the center line of the extendable cylinder 40 is at the predetermined x-axis position and the predetermined y-axis position, within a reachable range of movement of the modular assembly 20 on the rail element 16. The end-effector device 137 spins the motorized nut-runner 138 in a reverse direction to tighten the machine-engageable bolt 34, thus locking the modular assembly 20 to the rail element 16 when the swing arm 22 is at the predetermined x-axis position and the predetermined y-axis position. As previously described, the modular assembly 20 is fixedly locked to the rail element 16 by tightening the machine-engageable bolt 34 to the T-nut 35, compressively clamping the tapered portion 39a of the annular ridge 39 against the tapered portion 29a of the annular race 29. The angular orientation $\theta$ and rotational angle $\phi$ about the z-axis of the workpiece interface tool 80 can change with pivoting of the swing arm 22.

The robotic arm 5 positions the EOAT 10 to engage the second machine interface 37' of the modular assembly 20 to the end-effector device 137. The nut-runner 138 engages the machine-engageable bolt 67 of the worm gear 68, and the drive pin 139 fits into the locating dowel hole 96 on the worm gear adapter 70 to balance contact.

The robotic arm 5 positions the EOAT 10 to engage the second machine interface 37' of the modular assembly 20 to the end-effector device 137. The end-effector device 137 and robotic arm 5 adjust the modular assembly 20 in the direction of the z-axis and the rotational angle $\phi$ about the z-axis of the workpiece interface tool 80 by adjusting the rotator set 60. The nut-runner 138 engages the machine-engageable bolt 67 of the worm gear 68, and the drive pin 139 fits into the locating dowel hole 96 on the worm gear adapter 70 to balance contact.

The motorized nut-runner 138 of the end-effector device 137 spins the worm gear 68 thus rotating the worm wheel 64 and in turn the piston 50 and the center post 48 through the keyways 78, while the radial ball bearing 72 and the anti-rotation pin 74 keep the worm gear 68 and the worm gear adapter 70 stationary to the orientation of the outer casing 44 of the self-contained hydraulic cylinder device 42. The center post 48 is rotated to the aforementioned first position, opening the fluidic channels 46, 47 between the upper piston chamber 54 and the lower piston chambers 56, 57. Simultaneously, the machine-engageable bolt 67 of the worm gear 68, the driving head 92 and the locating dowel hole 96 are all on the same plane.

The robotic arm 5 re-positions the EOAT 10 to engage the second machine interface 37' of the modular assembly 20 to the end-effector device 137. The drive pin 139 of the end-effector device 137 is engaged in the locating dowel hole 96 and holds the distal end of the piston 50 while the robotic arm 5 drags the EOAT 10 to place the piston 50 at the predetermined z-axis position. The motorized nut-runner 138 then rotates the worm gear 68 thus rotating the worm wheel 64 and in turn the piston 50 and the center post 48 through the keyways 78, until the center post 48 is rotated away from the first position, closing the fluidic channels 46, 47 between the upper piston chamber 54 and the lower piston chambers 56, 57. The motorized nut-runner 138 continues to rotate the worm gear 68 thus rotating the worm wheel 64 and in turn the piston 50 to the desired rotational angle cp about the z-axis. The extendable cylinder 40 and the workpiece interface tool 80 are thus moved to the predetermined z-axis position and the predetermined rotational angle cp about the z-axis by rotation of the worm gear 68.

By repeating the same setup process for each modular assembly 20, the EOAT 10 can be configured for a specific application. All the above adjustments can be programmed and positioned to a precision level determined based upon the controllability of the robotic arm 5 and modular assembly 20. The predetermined x-axis and y-axis positions are converted to X and $\theta$ values for programming. The predetermined orientation of the workpiece interface tool 80 compensated for the swing arm 22 rotation $\theta$ is calculated into the actual rotation angle of the worm wheel 64, which is then converted to the number of turns of the worm gear 68 needed in programming the end-effector device 137 to achieve the predetermined rotational angle φ about the z-axis. The workpiece interface tool 80 can then be swiveled to the swivel angle α relative to the longitudinal axis 41 via the lockable swivel device 90.

Alternatively the EOAT 10 can be in a fixed location, e.g., on a stand (not shown), and the end-effector device 137 can be operatively attached to the robotic arm 5 to configure the EOAT 10 as described above.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for configuring an end-of-arm tool attachable to an articulable robotic arm, comprising:
    slidably engaging an adjustable modular unit including a swing arm, an extendable cylinder, and a workpiece interface tool to a rail element of the end-of-arm tool;
    defining an x-axis relative to the rail element and defining an x-y plane relative to the swing arm and defining a z-axis orthogonal to the x-y plane;
    machine-sliding the adjustable modular unit in the rail element to a preferred x-axis position;
    machine-pivoting the swing arm to a preferred angular orientation determined based upon a preferred y-axis position and the preferred x-axis position;
    machine-extending the extendable cylinder along a longitudinal axis to a preferred z-axis position; and
    machine-rotating the workpiece interface tool to a preferred rotational angle about the z-axis.

2. The method of claim 1, comprising:
    engaging an external end-effector to a first machine interface comprising a machine-engageable bolt and dowel hole of the adjustable modular unit;
    loosening the machine-engageable bolt with the external end-effector;
    sliding the machine-engageable bolt in the rail element to the preferred x-axis position;
    pivoting the dowel hole around the machine-engageable bolt with the drive pin to the preferred angular orientation; and
    tightening the machine-engageable bolt with the external end-effector.

3. The method of claim 2, wherein sliding the machine-engageable bolt in the rail element comprises moving the articulable robotic arm relative to the external end-effector engaged to the first machine interface.

4. The method of claim 1, comprising:
    engaging a motorized nut runner and a drive pin of an external end-effector to a first machine interface comprising a machine-engageable bolt and dowel hole of the adjustable modular unit;
    loosening the machine-engageable bolt with the motorized nut runner;
    sliding the machine-engageable bolt in the rail element and pivoting the dowel hole around the machine-engageable bolt with the drive pin to the preferred angular orientation to achieve the preferred y-axis position and the preferred x-axis position; and
    tightening the machine-engageable bolt with the external end-effector.

5. The method of claim 1, comprising:
    engaging a motorized nut runner and a drive pin of an external end-effector to a second machine interface comprising a machine-engageable bolt and a locating dowel hole of a rotator set attached to an end of the extendable cylinder distal to the swing arm;
    spinning the machine-engageable bolt of the rotator set to rotate a piston of the extendable cylinder to a first position; and
    longitudinally extending the piston to the preferred z-axis position.

6. The method of claim 5, further comprising spinning the machine-engageable bolt of the rotator set to rotate the piston away from the first position to lock the piston in the preferred z-axis position.

7. The method of claim 5, further comprising
    spinning the machine-engageable bolt of the rotator set to rotate the piston to the first position comprising a rotational angle where at fluidic channels within the cylinder are opened; and
    permitting flow of hydraulic fluid between an upper piston chamber and a lower piston chamber of the cylinder in the first position.

8. The method of claim 1, wherein machine-rotating the workpiece
    interface tool to the preferred rotational angle about the z-axis comprises
    engaging a motorized nut runner and a drive pin of an external end-effector to a second machine interface comprising a machine-engageable bolt and a locating dowel hole of a rotator set attached to an end of the cylinder distal to the swing arm; and
    spinning the machine-engageable bolt of the rotator set to rotate the rotator set to the preferred rotational angle.

9. The method of claim 1, further comprising: machine-swiveling the workpiece interface tool to a preferred swivel angle relative to the longitudinal axis of the cylinder.

10. The method of claim 9, comprising:
    engaging a motorized nut runner and a drive pin of an external end-effector to a third machine interface comprising a driving head of a lockable swivel device and a locating dowel hole of a rotator set attached to an end of the cylinder distal to the swing arm; and
    swiveling the workpiece interface tool to the preferred swivel angle relative to the longitudinal axis of the cylinder.

11. The method of claim 9, comprising machine-swiveling the workpiece interface tool to the preferred swivel angle relative to the longitudinal axis of the cylinder prior to the machine-extending the cylinder along the longitudinal axis of the cylinder and the machine-rotating the workpiece interface tool to the preferred rotational angle.

12. The method of claim 1, comprising:
    engaging an external end-effector to a first machine interface comprising a machine-engageable bolt of the adjustable modular assembly and a dowel hole of the swing arm; and
    sliding the swing arm along the rail element to the preferred x-axis position and pivoting the swing arm around the machine-engageable bolt to the angular orientation determined based upon the preferred y-axis position and the preferred x-axis position.

13. The method of claim 12, further comprising:
    engaging the external end-effector to a third machine interface comprising a driving head of a lockable swivel device and a locating dowel hole of a rotator set attached to an end of the cylinder distal to the swing arm; and swiveling the workpiece interface tool to a preferred swivel angle relative to the longitudinal axis of the cylinder.

14. The method of claim 13, further comprising:

engaging the external end-effector to a second machine interface attached to an end of the cylinder; and longitudinally extending the cylinder to the preferred z-axis position.

15. The method of claim 14, further comprising rotating the rotator set to the preferred rotational angle about the z-axis.

16. A method for configuring a workpiece interface tool for a robotic arm, comprising:

slidably engaging an adjustable modular unit including a swing arm, an extendable shaft, and the workpiece interface tool to a rail element of an end-of-arm device attached to the robotic arm;

machine-sliding the adjustable modular unit in the rail element and machine-pivoting the swing arm to a preferred position and a preferred angular orientation;

machine-swiveling the workpiece interface tool to a preferred swivel angle;

machine-extending the extendable shaft along a longitudinal axis of the cylinder to a preferred position; and machine-rotating the workpiece interface tool to a preferred rotational angle.

17. The method of claim 16, wherein machine-sliding the adjustable modular unit in the rail element comprises moving the robotic arm relative to an external end-effector engaged to a machine interface of the adjustable modular unit.

18. A method for configuring a workpiece interface tool for a robotic arm, comprising:

constructing an end-of-arm tooling device including a rail element defining an x-axis orientation, a swing arm projecting in a y-axis orientation and having a first end slidably attached to the rail element and pivotable in an x-y plane, an extendable shaft fixedly attached to a second end of the swing arm and having a longitudinal axis projecting in a z-axis orientation and extendable longitudinally, an adjustable rotator set attached to the extendable shaft and rotatable around the longitudinal axis, a first machine interface device operably attached to the swing arm, and a second machine interface device operably attached to the adjustable rotator set;

attaching the workpiece interface tool to the extendable shaft;

engaging an external end-effector device to the first machine interface;

sliding and pivoting the swing arm to a preferred x-axis position and an angular orientation in the x-y plane;

engaging the external end-effector device to the second machine interface; and rotating and extending the adjustable rotator set and the extendable shaft to a preferred z-axis position and a preferred rotational angle oriented about the z-axis.

19. The method of claim 18, further comprising constructing an adjustable swivel device between the workpiece interface tool and the extendable shaft and a third machine interface device operably attached to the adjustable swivel device;

engaging the external end-effector device to the third machine interface; and swiveling the adjustable swivel device to a preferred swivel angle.

20. The method of claim 18, wherein sliding the swing arm to the preferred x-axis position comprises moving the robotic arm relative to the external end-effector engaged to the first machine interface.

* * * * *